(12) United States Patent
Armstrong et al.

(10) Patent No.: US 9,720,706 B2
(45) Date of Patent: Aug. 1, 2017

(54) GENERATING TASK FLOWS FOR AN APPLICATION

(71) Applicant: INTERNATIONAL BUSINESS MACHINES CORPORATION, Armonk, NY (US)

(72) Inventors: Andrew Alan Armstrong, Hursley Park (GB); Richard William Pilot, Hursley Park (GB)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 14/473,696

(22) Filed: Aug. 29, 2014

(65) Prior Publication Data

US 2016/0062559 A1    Mar. 3, 2016

Related U.S. Application Data

(63) Continuation of application No. 13/884,985, filed on Jun. 23, 2014.

(30) Foreign Application Priority Data

Apr. 4, 2011  (EP) .................................. 11160931

(51) Int. Cl.
G06F 3/00 (2006.01)
G06F 9/44 (2006.01)
G06Q 10/06 (2012.01)

(52) U.S. Cl.
CPC ........... *G06F 9/4443* (2013.01); *G06Q 10/06* (2013.01)

(58) Field of Classification Search
CPC ............................. G06F 3/0482; G06F 9/4443

(Continued)

(56) References Cited

U.S. PATENT DOCUMENTS 8,656,304 B2 * 2/2014 Tsuda .................... G06F 3/0482
                                                        396/429
8,737,221 B1 * 5/2014 Jilani .................. H04L 47/2416
                                                        370/235

(Continued)

FOREIGN PATENT DOCUMENTS

CN    101821709 A    9/2010
CN    101981522 A    2/2011

OTHER PUBLICATIONS

International Application No. PCT/IB2012/050683, International Search Report, Jun. 14, 2012.

(Continued)

*Primary Examiner* — William Titcomb
(74) *Attorney, Agent, or Firm* — Yudell Isidore PLLC (57) ABSTRACT

The present disclosure provides a method for generating task flows for an application. Actions of a user of an application are monitored and key actions carried out by the user in the application are logged. Based on a determined flow of key actions a task flow is formed. A representation of the task flow is stored for access by other users. The stored representation of a task flow is associated with a goal to be achieved in the application. Representations of task flows may be stored locally to the application for access by other users of the application or remotely stored with an indication of the application to which a task flow relates to provide access to the task flows by users of other applications. A list of stored representations of task flows may be provided to enable selection of a task flow.

18 Claims, 4 Drawing Sheets

(58) Field of Classification Search
USPC .......................................................... 715/746
See application file for complete search history.

(56) References Cited

U.S. PATENT DOCUMENTS

| | | | |
|---|---|---|---|
| 9,195,936 B1* | 11/2015 | Chase ........................ | G06F 8/65 |
| 9,229,626 B2* | 1/2016 | Tuang ................... | G06F 3/0482 |
| 2004/0230466 A1 | 11/2004 | Davis et al. | |
| 2005/0097536 A1 | 5/2005 | Bernstein et al. | |
| 2005/0120352 A1* | 6/2005 | Subramaniam ... | G06F 17/30557 |
| | | | 719/310 |
| 2005/0144150 A1 | 6/2005 | Ramamurthy et al. | |
| 2006/0236304 A1* | 10/2006 | Luo ........................... | G06F 8/34 |
| | | | 717/105 |
| 2007/0016573 A1 | 1/2007 | Nanavati et al. | |
| 2007/0234224 A1* | 10/2007 | Leavitt ................... | B60K 35/00 |
| | | | 715/762 |
| 2007/0265895 A1 | 11/2007 | Moore | |
| 2007/0299795 A1 | 12/2007 | MacBeth et al. | |
| 2008/0028363 A1 | 1/2008 | Mathew | |
| 2008/0147453 A1 | 6/2008 | Kogan et al. | |
| 2009/0006400 A1* | 1/2009 | Lopez ..................... | G06F 3/048 |
| 2009/0138318 A1 | 5/2009 | Hawkins | |
| 2009/0172149 A1 | 7/2009 | Bobak et al. | |
| 2009/0276457 A1 | 11/2009 | Moulckers et al. | |
| 2010/0124196 A1* | 5/2010 | Bonar ................. | H04B 7/0689 |
| | | | 370/329 |
| 2011/0145738 A1* | 6/2011 | Laugwitz .............. | G06F 3/0482 |
| | | | 715/763 |
| 2011/0258594 A1* | 10/2011 | Syme ...................... | G06F 8/445 |
| | | | 717/106 |
| 2012/0016678 A1* | 1/2012 | Gruber ................ | G06F 17/3087 |
| | | | 704/275 |
| 2012/0151279 A1* | 6/2012 | Armstrong .......... | G06F 11/0793 |
| | | | 714/48 |
| 2012/0235921 A1* | 9/2012 | Laubach .............. | G06F 3/0238 |
| | | | 345/172 |
| 2013/0275164 A1* | 10/2013 | Gruber ................... | G10L 17/22 |
| | | | 705/5 |
| 2014/0123072 A1* | 5/2014 | Bhowmick ......... | G06F 3/04817 |
| | | | 715/838 |
| 2014/0310318 A1* | 10/2014 | Armstrong ............ | G06Q 10/06 |
| | | | 707/803 |
| 2015/0074541 A1* | 3/2015 | Schwartz .............. | H04L 67/025 |
| | | | 715/740 |

OTHER PUBLICATIONS

Anonymous, Predictive User Interface for Efficiently Building Repetitive Workflows, IP.com No. IPCOM00172037D, Jun. 25, 2008.
Christy, Kim Y., Non-Final Office Action, U.S Appl. No. 13/884,985, The United States Patent and Trademark Office, Jul. 20, 2016.

* cited by examiner

GENERATING TASK FLOWS FOR AN APPLICATION

PRIORITY CLAIM

The present application is a continuation of U.S. patent application Ser. No. 13/844,985, titled "Generating Task Flows for an Application," filed on Jun. 23, 2014, the contents of which is incorporated herein by reference in its entirety.

BACKGROUND

1. Technical Field

The present disclosure relates to improving task completion in an application. In particular, the present disclosure relates to generating task flows for an application.

2. Description of the Related Art

When users perform a series of tasks or attempt to accomplish a goal in an unfamiliar application, they can often struggle to recognize how to complete their task or in what order to perform tasks in. This may lead to a user becoming confused and frustrated with the application. Additionally, the user may not utilize an application to its full potential, costing the user valuable time and putting added strain on support services.

This problem is often caused by poor application documentation that does not explain how a goal is achieved. It may also be caused by poorly designed interfaces that do not explain the ordering of tasks and, more commonly, the inability to find specific documentation for a task.

There are several potential solutions to this problem. One such solution is to update the documentation to represent the correct flow a user should take through the application but this may not account for all possible tasks flows. Another such solution is for the developers to redesign the interface so that it is more intuitive for a user to understand what tasks should occur next. However the redesign of an interface or system can be an expensive process. Additionally, both of these solutions could only be performed after suitable usability testing has been performed on a product which has identified problem areas. Thus, these processes can only be performed late into a product's development lifecycle. Additionally, these solutions are also manual processes and are therefore both expensive and time consuming to the developer.

SUMMARY

According to an embodiment of the present disclosure, there is provided, in a first aspect, a method for generating task flows for an application. The method comprises monitoring actions of a user of an application. Key actions carried out by a user in the application are logged. Based on a determined a flow of key actions, a task flow is formed. A representation of the task flow is then stored for access by other users.

According to a second aspect of the present disclosure there is provided a system for generating task flows for an application. The system comprises a listener component for monitoring actions of a user of an application; a logging component for logging key actions carried out by a user in the application; a task flow determining component for determining a flow of key actions to form a task flow; and a data store for storing a representation of the task flow for access by other users.

According to a third aspect of the present disclosure there is provided a computer program stored on a computer readable medium and loadable into the internal memory of a digital computer, comprising software code portions, when said program is run on a computer, for performing the method of the first aspect of the present disclosure.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

DETAILED DESCRIPTION OF AN ILLUSTRATIVE EMBODIMENT

Described herein is a system, method, and computer program product for generating task flows for an application. Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the present disclosure. However, it will be understood by those skilled in the art that the present disclosure may be practiced without these specific details. In other instances, well-known methods, procedures, and components have not been described in detail so as not to obscure the present disclosure.

The method, system and computer product described herein are described from the perspective of an application that monitors tasks a user performs as he progresses through a system whilst attempting to achieve a goal. A representation of this task flow through the system can be generated and used to aid other users of the application in achieving the same task. This improves the usability of a product and allows new users to familiarize themselves with an application or task more quickly.

User actions are monitored during uptime of the application and key actions or tasks that the user undertakes are logged. Examples of key actions or tasks include "Create a new Project" and "Add a Class". Once a user completes a series of actions, the log of completed tasks is stored as a set. This set may be stored in the application. A set of actions may be additionally or alternatively stored in an online repository. An online repository may be non-application specific and the application that is submitting the data may also be logged so that the data can be retrieved by other applications.

An application may retrieve sets from a local storage or repository and present them to a user as a new option. This option may provide the user with a name for the set and may additionally provide a list of tasks that make up the set.

Over time, including during the development of the application, common activities will emerge and may be logged to the local storage and/or the online repository. These sets may then be weighted. Sets that are similar or identical to those already in the system may be given a higher weighting. The weighting may be used to prioritize an ordering of links being returned to the application.

As an example embodiment, the described system may be implemented using a software testing automation tool for a Rich Client Platform (RCP) application. Once new task flows through an application have been identified these would be shared across users where it may be perceived to be useful. For example, if the described system was provided in a development project and a new project wizard was opened, an extra drop down menu may be provided that shows the latest task flows for specific tasks. Optionally, there may be provided a menu to enable a user to search the task flows for a particular goal.

This system of the present disclosure may be embedded into an application using a plug-in which allows an understanding of the application and user actions inside an RCP application. This system may also be interfaced with an application through an internal API of the application. The described method and system aims to introduce the user to new task flows or concepts that they have not used before. It allows users to use/discover a flow through an application that they were previously unaware of. This may be provided as an addition to help documentation which may otherwise confuse the user. The provided system thus enables users to educate themselves and other users about new functionality in an application which reduces the strain on support staff and service of an application.

The present disclosure allows automated and dynamic generation/creation of task flows throughout software to be provided and explained to the user. This solution is more cost-effective alternative over the manual solutions of the prior art. The present disclosure avoids a need for support services of an application to be overloaded with customer usability issues such as "I cannot find out how to do this" requests. The present disclosure may also make a software more efficient to use since, for example, a user is able to achieve something in a couple of clicks instead of navigating many windows. It further allows a user to discover new paths to achieving new or similar tasks, thus exposing more functionality of the application. Additionally, the sharing of new task flows between users via a task flow repository (e.g., remote repository 140) enables users to find new areas of functionality which they may not have explored before and creates a richer environment where users can assist users. This functionality is more efficient and cheaper than calls to support staff. The task flow generation system may be provided as a service to a customer over a network.

Figure 1:
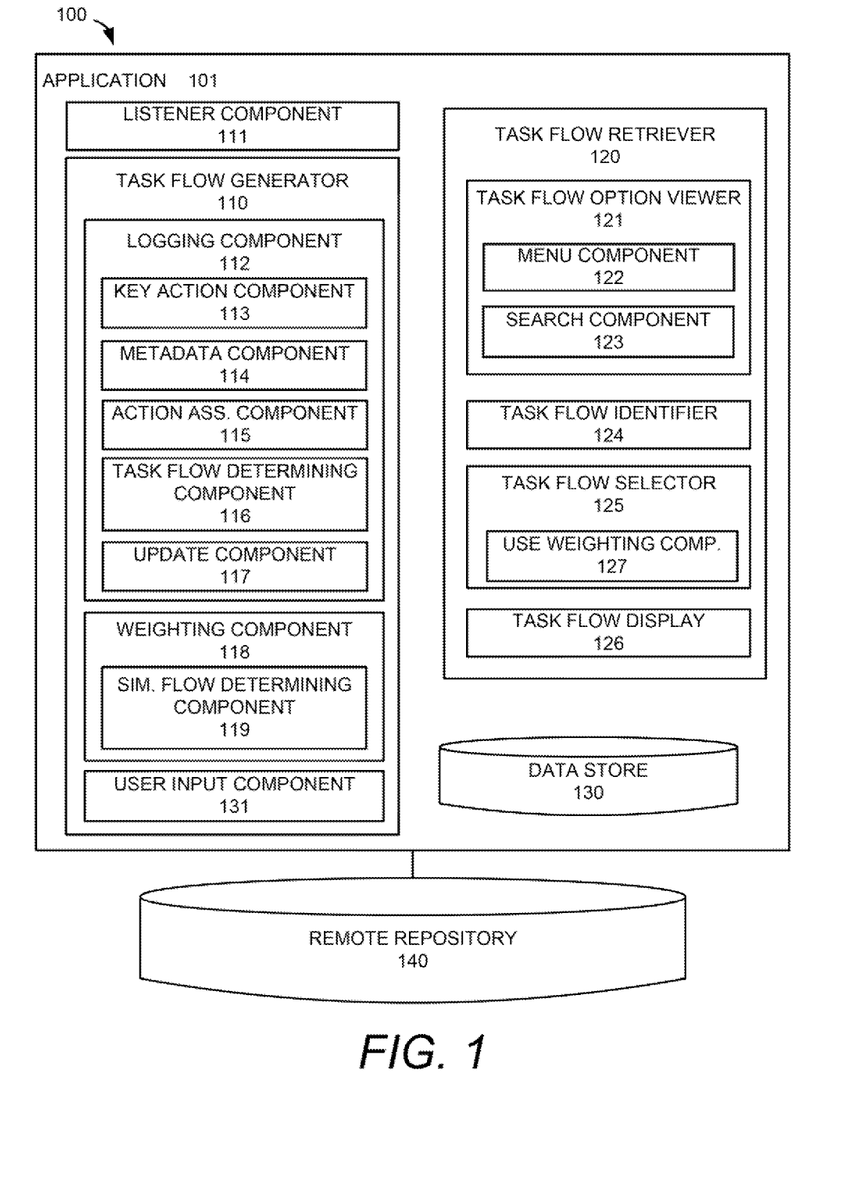
FIG. 1 is a block diagram of a system according to an embodiment of the present disclosure.

Referring to FIG. 1, there is pictured a block diagram of an example embodiment of system 100. Application 101 is provided for which task flows are to be generated and used. In FIG. 1, the components of system 100 are shown within the application 101 to be monitored. However, some or all the components may be provided externally to the application 101.

Listener component 111 is provided for monitoring user actions of application 101. Listener component 111 may be an established listener product. Alternatively listener component 111 may be an API (application programming interface) internal to application 101.

Task flow generator 110 is provided for processing user actions as monitored by listener component 111. Task flow generator 110 may include logging component 112 for logging the actions of one or more users of application 101. Task flow generator 110 may be embedded in the application 101. Alternatively, task flow generator 110 may be provided as a plug-in to application 101 or may be provided separately from application 101.

The actions of users may include anything carried out by a user when interacting with application 101. Logging component 112 may include key action component 113 for determining key actions to log. If listener component 111 is an established listener, key action component 113 maintains a list that describes of what are considered to be key actions. When any action is then triggered, a determination is made as to whether it is considered a key action. If listener component 111 is an internal API, key action component 113 maintains a list and registers itself against any hooks or triggered actions it is interested in.

The Logging component 112 may also include a metadata component 114 for logging any metadata associated with user actions. Logging component 112 may include an action association component 115 for associating a user's actions with other user(s) actions. Logging component 112 may also include a task flow determining component 116 for determining a set of actions that form a task flow. Task flow determining component 116 may identify actions that start or end a chain or flow. Logging component 112 may store task flows in the form of sets of actions at regular intervals, as well as, optionally, at the end of a task flow. Logging component 112 may also include an update component 117. Update component 117 of the logging component 112 may store representations of task flows in a data store 130 local to the application 101. Additionally, or alternatively, update component 117 may store representations of the task flows in a remote repository 140 for access by other applications. Storage of the task flows in a remote repository 140 may identify the originating application 101, as task flows from different applications may also be stored remotely.

Task flow generator 110 may also include a weighting component 118 including a similar flow determining component 119 that determines if a task flow has been logged before. Flow determining component 119 increases a weighting for more frequently occurring task flows. The weighting may be added to a stored task flow in data store 130 or remote repository 140. Task flow generator 110 may also include a user input component 131 for receiving input of a name of a task flow or for input of an association of a task flow with a goal for storage.

A task flow retriever 120 may be provided for application 101 for a user to retrieve and use previously stored representations of task flows in the form of sets of actions. Task flow retriever 120 may be embedded in application 101. Alternatively task flow retriever 120 may be provided as a plug-in to application 101 or may be separate from application 101. Task flow retriever 120 may retrieve task flows for application 101 from local data store 130 or may contact remote repository 140 to retrieve task flows stored by this or other applications.

Task flow retriever 120 further comprises a task flow option viewer 121 which enables a user to view available stored representations of task flows. Task flow option viewer 121 may include a menu component 122 for stored task flows and a search component 123. Viewed task flows may also include a name or associated goal to help a user identify useful task flows. The viewed task flows may also include a list of applications to which they apply.

A task flow identifier 124 may be provided to identify task flows that match the first few actions of a user, in order to suggest subsequent actions or flows.

A task flow selector 125 may select a stored task flow to be used. The selected task flow may be weighted by frequency of users retrieving and using a task flow. The task flow selector 125 may include a use weighting component 127 to increase a task flow's weighting when selected by a user.

A task flow display 126 may display the a representation of the selected task flow in a manner in which the user can follow the set of actions in order to complete the goal in application 101.

Figure 2:
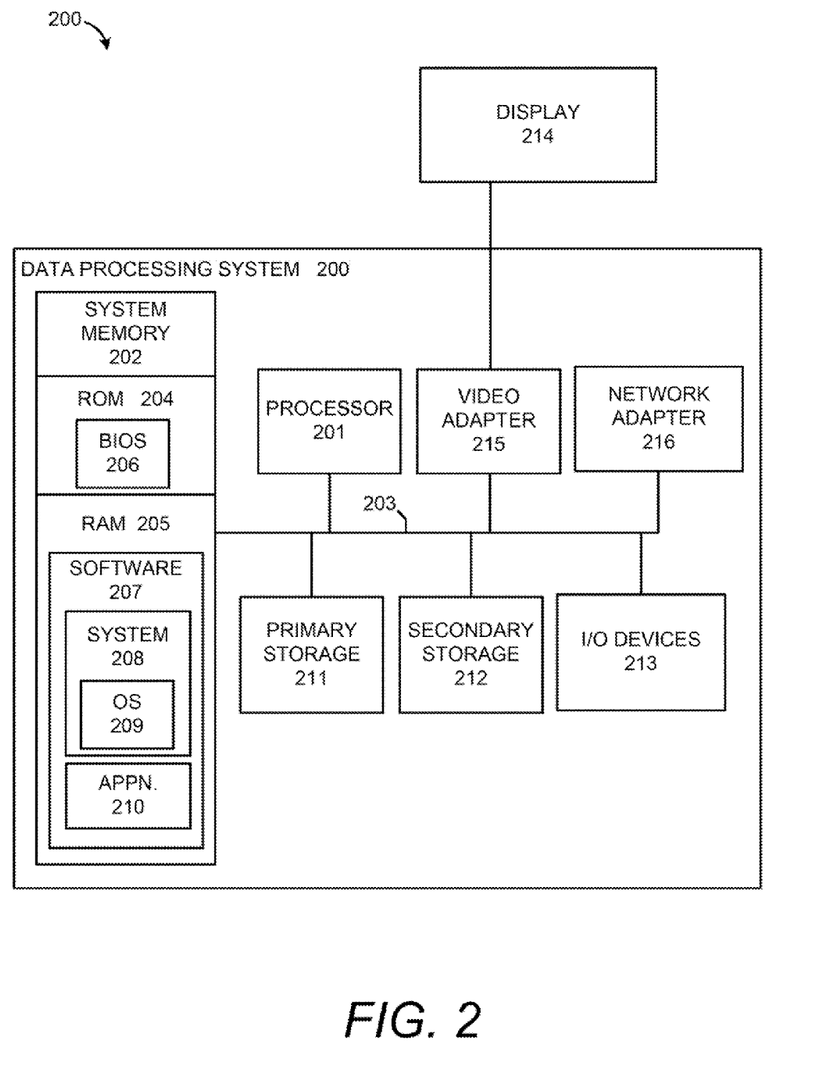
FIG. 2 is a block diagram of a computer system according to an embodiment of the present disclosure.

Referring to FIG. 2, an exemplary system for implementing aspects of the disclosure includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

Data processing system 200 may also include a primary storage 211. Primary storage 211 may be, for example, a magnetic hard disk drive. Secondary storage 212 is also provided. Secondary storage 212 may be in the form of a magnetic disc drive or an optical disc drive, for example. Magnetic and/or optical disc drives and their associated computer-readable media provide non-volatile storage of computer-executable instructions, data structures, program modules and other data for data processing system 200. Software applications may be stored on the primary storage 211 and/or secondary storage 212 as well as in system memory 202.

Data processing system 200 may operate in a networked environment using logical connections to one or more remote computers via a network adapter 216. Input/output devices 213 can be coupled to data processing system 200 either directly or through intervening I/O controllers (not pictured). A user may enter commands and information into the data processing system 200 through I/O devices 213, which may comprise input devices such as a keyboard, pointing device, or other input devices (for example, microphone, joy stick, game pad, satellite dish, scanner, or the like). Output devices may include speakers, printers, etc. A display 214 is also connected to system bus 203 via an interface, such as video adapter 215.

Figure 3:
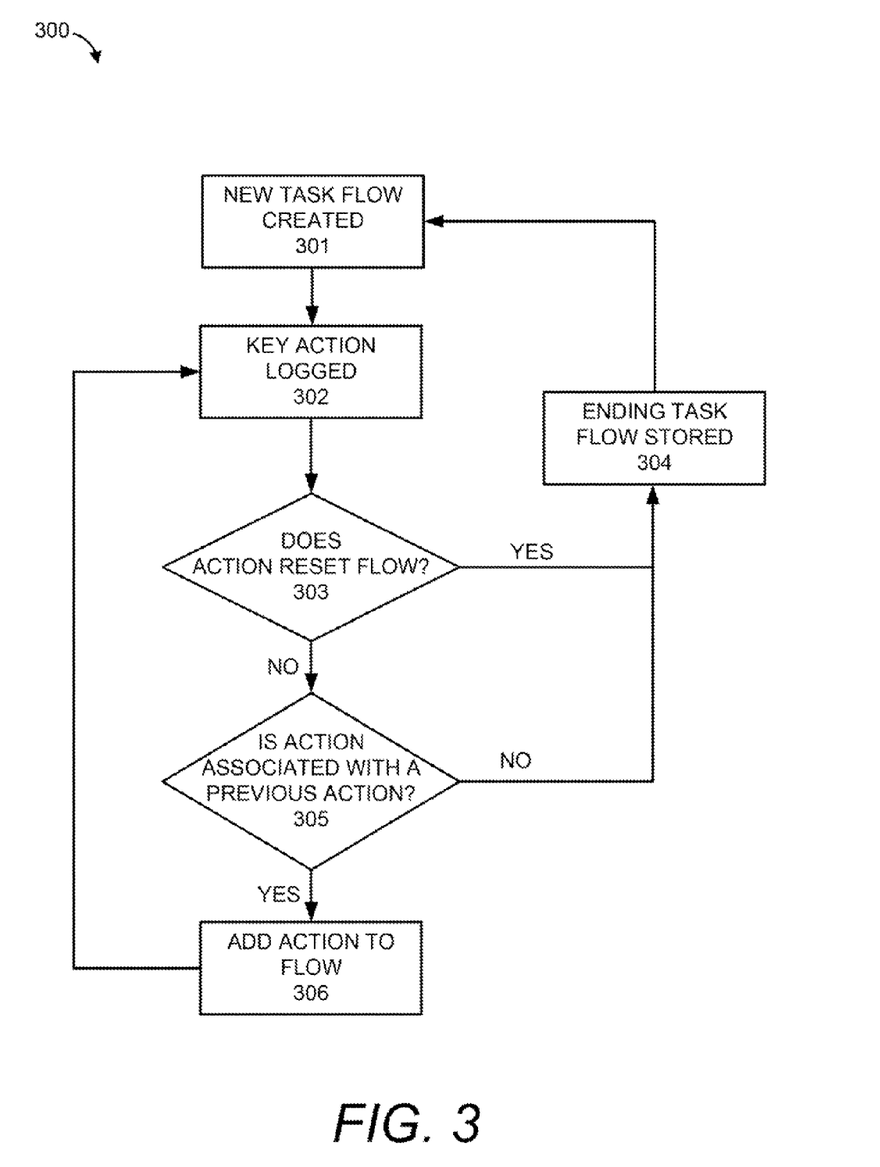
FIG. 3 is a flow diagram of a method according to an embodiment of the present disclosure.

Referring to FIG. 3, there is illustrated a flow diagram 300 for monitoring and identifying task flows in an application. At block 301 new task flow is created for an application. Key actions within created the application are then logged (block 302). These key actions represent key points during the users' operations of the system, such as 'New Project' (which includes the type of project being created), 'New Class/File', or changes to project configuration (such as Build Path modification).

At block 303 it is determined if an action resets a task flow of the application. Certain actions, such as a new project or exiting the system will reset the task flow of the application. If it is determined that an action resets the task flow of the application, the ending task flow is stored locally to the application and/or to a remote repository with an indication of the originating application (block 304). The process then loops to start a new task flow 301.

If it is determined that an action does not reset the task flow of the application, it is determined at block 305 if the action is associated with a previous action. If it determined that the action is not associated with a previous action, the ending task flow is stored 304 and the process loops to a start a new task flow 301. If it determined that the action is associated with a previous action, at block 306 the action is recorded in the flow with a link to the previous action, creating a task flow or chain of actions (Action=menu→new project: Outcome=new project). Other actions, such as linking one project to another project, may add the action onto an existing flow. The process then loops back to block 302 and a next key action is logged.

When the task flow listener records task flows, it may optionally record metadata entered by a user. For example, the key action "Create a New Project" would have metadata regarding what the name of the project is. Once a task flow has ended and is stored, the metadata may be stored for the life of the application's execution along with the flows that it is associated with. Alternatively the metadata may be discarded.

If a user starts a new task flow and one of its actions involves linking to the project described in a previous task flow, the implementation may make a determination as to whether the two task flows should be linked. Key actions may also be marked as linking actions. The stored action "Link To Project" may contain a flag that would indicate to this method that it should link to a previous task flow, if a previous task flow exists.

After a specified amount of time, the logging component may connect to a repository to upload the task flows it has collected and retrieve any stored new flows other users have recorded for the application. A generated task flow may be named to associate it with a goal.

It may also be determined if an ending task flow is similar to existing stored task flows. In this case the ending task flow is not stored and a weighting of the existing task flow is increased. When comparing task flows, it is determined whether the key actions are the same. If the key actions are the same a weighting is added to an existing task flow. During the comparison, the specific metadata that the user entered (e.g. Project Name, Class Name) may not be considered.

The stored task flows are updated dynamically and thus the current usage of the application by users is reflected in the available task flows. The common usage of an application may evolve over time through users gaining expertise in the operation of the application or if required goals change. A changing usage may be reflected in the dynamically updated task flows.

A user of the application may use generated task flows. Depending on where the solution is implemented, the task flows may be displayed in a form suitable for that application, such as via the "File Menu→New Task Set" or as a project grouping in a new project's window in products or applications in software development environments.

When a product is started or after a predetermined period, the application may contact remote repository 140 to obtain an updated list of recorded task flows. This list of recorded task flows may be ordered by a weighting. Whenever a user chooses one task flow from the list of recorded task flows, the weighting of the selected task flow may increase. This ensures that flows that are frequently used will move to the top of the list of recorded task flows.

Figure 4:
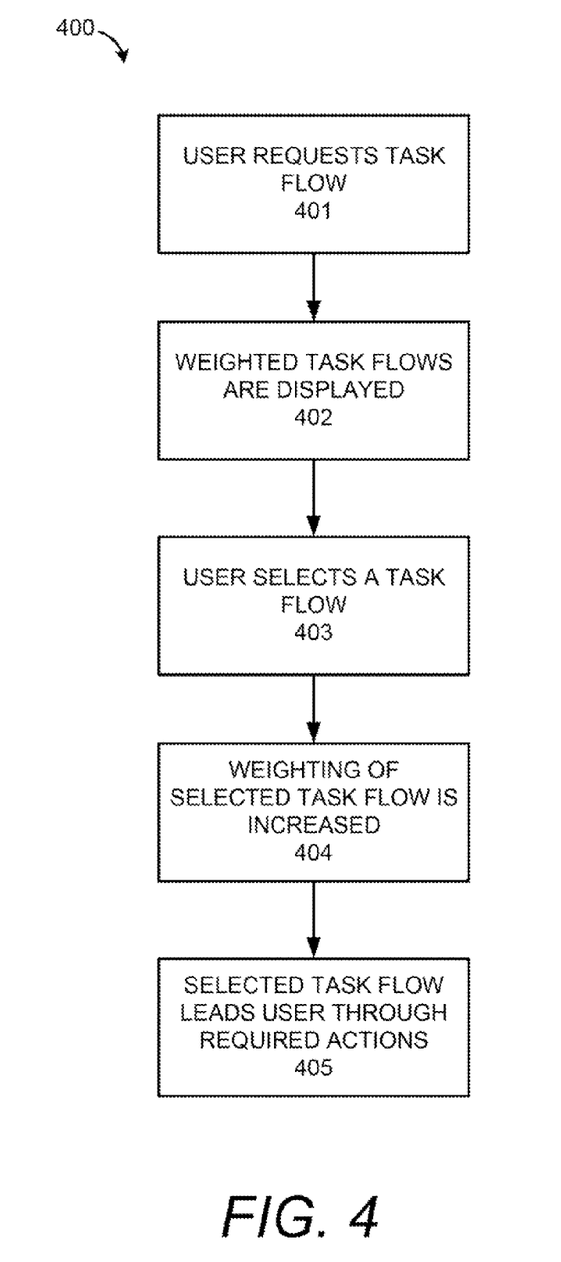
FIG. 4 is a flow diagram of a method according to an embodiment of the present disclosure.

Referring to FIG. 4, there is provided a flow diagram 400 exemplifying a method of using generated task flows. At block 401 a request is received for a task flow for a goal of an application. At block 402 the weighted task flows are displayed 402. A list task flows to choose from may be displayed. Alternatively all task flows may be displayed/viewed responsive to a request. At block 403 selection of a task flow is received. The weighting of the selected task flow is then increased at block 404. The representation of the selected task flow is then used to lead a user through the actions required to achieve the goal (block 405).

The present disclosure can take the form of an entirely hardware embodiment, an entirely software embodiment, or an embodiment containing both hardware and software elements. In another embodiment, the present disclosure is implemented in software, which includes but is not limited to firmware, resident software, microcode, etc.

The present disclosure can take the form of a computer program product accessible from a computer-usable or computer-readable storage medium providing program code for use by or in connection with a computer or any instruction execution system. For the purposes of this disclosure, a computer usable or computer-readable storage medium can be any tangible apparatus that contains, stores, communicates, propagates, or transports the program for use by or in connection with the instruction execution system, apparatus, or device. The medium can be an electronic, magnetic, optical, electromagnetic, infrared, or semiconductor system (or apparatus or device). Examples of a computer-readable storage medium/device include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

While the invention has been described with reference to exemplary embodiments, it will be understood by those skilled in the art that various changes may be made and equivalents may be substituted for elements thereof without departing from the scope of the invention. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many improvements, modifications, and variations will be apparent to those of ordinary skill in the art without departing from the scope and spirit of the present disclosure. In addition, many modifications may be made to adapt a particular system, device or component thereof to the teachings of the invention without departing from the essential scope thereof. The embodiment was chosen and described in order to best explain the principles of the invention and the practical application, and to enable others of ordinary skill in the art to understand the invention for various embodiments with various modifications as are suited to the particular use contemplated. Therefore, it is intended that the invention not be limited to the particular embodiments disclosed for carrying out this invention, but that the invention will include all embodiments falling within the scope of the appended claims.

Moreover, the use of the terms first, second, etc. do not denote any order or importance, but rather the terms first, second, etc. are used to distinguish one element from another. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for generating task flows for an application, the method comprising:

receiving user input via at least one input device of a data processing system;

monitoring the user input via a listener component of the data processing system to identify a plurality of actions taken by a user within an application;

comparing each of the plurality of actions to a plurality of predetermined key actions within a key action list stored within the data processing system, wherein the plurality of predetermined key actions represents specific actions taken within the application that include at least one of: changes that affect an operation of the data processing system for the user; and changes to a project configuration within the application;

determining, based on the comparing of each of the plurality of actions to the plurality of predetermined key actions, at least one key action from among the plurality of actions taken by the user within the application that matches at least one of the plurality of predetermined key actions;

logging the at least one key action within the data processing system;

determining whether the at least one key action is associated with at least one previous key action taken that is logged within the data processing system;

in response to determining the at least one key action is associated with at least one previous key action, linking the at least one key action to the at least one previous key action to form a task flow; and storing, in a data store, a representation of the task flow for access by other users of the application.

2. The method as claimed in claim 1, further comprising:

monitoring user actions by at least one user of the application to identify a changing usage of the application; and dynamically updating one or more representations in the data store based on the changing usage.

3. The method as claimed in claim 1, further comprising: weighting the task flow by at least one of a frequency of occurrence of the task flow and one or more similar task flows.

4. The method as claimed in claim 1, further comprising: associating the representation of the task flow with a goal to be achieved in the application.

5. The method as claimed in claim 1, wherein the data store is locally accessible by the application.

6. The method as claimed in claim 1, further comprising: remotely storing, in a remote storage repository, the representation of the task flow with an indication of the application, wherein the representation of the task flow is accessible by other applications.

7. The method as claimed in claim 6, further comprising: obtaining, from the remote storage repository, an updated list of recorded task flows; dynamically updating the one or more representations in the data store based on the updated list.

8. The method as claimed in claim 7, wherein the one or more representations in the data store are updated responsive to a predetermined time period expiring.

9. The method as claimed in claim 7, wherein the one or more representations in the data store are updated responsive to a starting of the application.

10. The method as claimed in claim 1, further comprising: providing a selection list of one or more stored representations associated with one or more task flows; receiving a selection of a selected representation from among the one or more stored representations in the selection list; and displaying, on an output device, the selected representation to carry out the task flow.

11. The method as claimed in claim 10, further comprising: ordering the one or more stored representations in the selection list based on a corresponding weighting of each stored representation.

12. The method as claimed in claim 1, further comprising: weighting the task flow by at least one of a frequency of retrieval and a usage of the task flow.

13. The method as claimed in claim 1, further comprising: in response to determining the at least one key action is not associated with at least one previous key action: determining an end action of a previous task flow; and starting a new task flow with the at least one key action.

14. The method as claimed in claim 1, further comprising: in response to receiving a selection of a particular representation, increasing a weighting associated with the particular representation.

15. The method as claimed in claim 1, further comprising: determining whether the task flow is similar to at least one existing task flow in the data store; in response to determining the task flow is similar to at least one existing task flow, increasing the weighting of the at least one existing task flow.

16. The method as claimed in claim 15, wherein determining whether the task flow is similar to at least one existing task flow in the data store further comprises: determining whether the one or more key actions in the task flow are identical to one or more existing key actions in at least one existing task flow.

17. The method as claimed in claim 15, wherein determining whether the task flow is similar to at least one existing task flow in the data store further comprises: determining whether an end action of the task flow is similar to at least one existing task flow.

18. The method as claimed in claim 1, wherein the plurality of actions is monitored during an uptime of the application in which the user is interacting with the application.

* * * * *